Patented Oct. 17, 1933

1,931,394

UNITED STATES PATENT OFFICE 1,931,394

PROCESS FOR THE VULCANIZATION OF RUBBER

Winfield Scott, Akron, Ohio, assignor to The Rubber Service Laboratories Company, Akron, Ohio, a corporation of Ohio No Drawing. Application February 23, 1927
Serial No. 170,419

10 Claims. (Cl. 18—53)

My present invention is directed to the manufacture of vulcanized rubber by a process wherein there is employed as an accelerator of the vulcanization step, the product obtained by reacting an aldehyde in the presence of an acid upon a Schiff's base. The use of an accelerator of this type, as is hereinafter fully set forth and described, has been found to yield a fully vulcanized rubber product of high quality, in a shorter time and, if desired, at lower temperatures than are commonly employed in the vulcanization process.

It has been known for some time that many simple condensation products of equi-molecular proportions of aldehydes and amines, that is, compounds known as Schiff's bases possess properties that make them susceptible for use as accelerators in the vulcanization of rubber. The use of such simple compounds as accelerators has been described in British Patent 7,370 of 1914 to Peachey and in United States Patent 1,417,970 to Caldwell. The various aldehyde reaction products of the Schiff's bases were later shown to be superior in accelerating power to the simpler mono-molecular condensation products by North in a Patent No. 1,467,984 granted September 11, 1923.

In an earlier application, Serial No. 731,969 filed August 14, 1924, I have shown that the simple Schiff's bases are capable of rearrangement or transformation when treated with a small proportion of an acid which was subsequently neutralized and that these rearranged or modified Schiff's bases, when reacted with a further quantity of aldehyde, yielded products which comprised a class of active vulcanization accelerators capable of producing a vulcanized rubber of high quality.

I have now further found, as is hereinafter set forth in detail, that a class of compounds closely related to those described in my copending application referred to, and of which the present application is a continuation in part may be obtained by first manufacturing a Schiff base from an aliphatic aldehyde and an amine, and then further reacting the Schiff's base in the presence of small proportions of a relatively weak acid, preferably an aliphatic organic acid preferably containing from four to ten carbon atoms, with substantially two molecular proportions of an aliphatic aldehyde. The resulting products comprise a class of accelerators of the rubber vulcanization process that are rapid in their action and which aid in the production of a vulcanized rubber product of high quality.

An example illustrative of one mode of manufacturing an accelerator of the type set forth is as follows: Substantially 73 parts (1 molecular proportion) of normal butyl amine are reacted with approximately 72 parts (1 molecular proportion) of butyl-aldehyde. The reaction is carried out in a container equipped with a reflux condenser to return to the container any vapors evolved therefrom by the heat liberated in the reaction taking place. Alternatively, the reaction may be carried out in a closed container and the ingredients heated and reacted with one another under the pressure of the evolved vapors. Preferably, the reaction product is obtained by employing a jacketed container supplied with suitable heating and cooling means and causing the reaction to take place while maintaining the temperature of the ingredients and the product formed at a point below 40° C. The mixture is maintained under these conditions for approximately an hour to insure complete combination of the ingredients therein.

The reaction product is a Schiff's base and in the case of the materials mentioned is produced as is shown by the following equation:

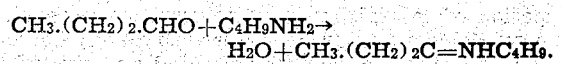

The Schiff's base obtained as described is then further reacted by combining one molecular proportion of the base with substantially two molecular proportions (144 parts) of butyl-aldehyde. This reaction is favored and the product obtained is improved in accelerating properties by the addition of small amounts, for example approximately 0.5 to 3% by weight of the total ingredients present of an acid of the fatty acid series, such as butyric, valeric, heptoic and the like. The reaction is preferably carried out in a closed container equipped with suitable means to maintain the mass at a temperature of approximately 80 to 95° C. Although other temperatures may be employed, it has been found that at lower temperatures the desired reaction proceeds relatively slowly while at much higher temperatures than those set forth, there is a tendency to produce side reaction products. The heating conditions are preferably maintained for several hours and it has been found that very active accelerators are produced by this process after heating for as much as forty hours as described. The extent of and time of heating varies, of course, with the quantity of material treated and upon the nature of the ingredients employed.

By proceeding in the manner as set forth there is obtained a reaction product of the aldehyde and the Schiff's base. The product is then allowed to cool and the lower layer, comprising water of condensation, is separated from the reaction product obtained. This reaction product is then more completely dried, if necessary, in any suitable manner and the final product, comprising a pale yellowish liquid is obtained.

An alternative procedure for manufacturing products of the type herein set forth is as follows. Approximately equal molecular proportions of butyl-chloride and aqueous or alcoholic solutions of ammonia are reacted in a closed apparatus at a temperature of from 110 to 125° C. for a period of from four to eight hours. Any excess of ammonia is then removed from the mixture and the solution containing a mixture of butylamine hydrochlorides is evaporated nearly to dryness. The calculated quantity of strong caustic soda solution is then added to the mass and the free amines distilled therefrom. Normal butylamine, di-n-butylamine and tri-n-butylamine are thereby obtained. The amine content of the mixture of butylamines is then determined for example by titration methods and substantially one molecular proportion of butyl-aldehyde is added for each molecule of amino-nitrogen found by analysis.

The reaction between the amines and aldehyde is carried out preferably in a container equipped with a reflux condenser to avoid volatilization losses and the temperature of the reaction mixture is maintained preferably below 40° C., although temperatures up to 100° C. may be employed without seriously affecting the product obtained. After completion of this first reaction, that is the production of a mixture of Schiff's bases, a quantity of butyl-aldehyde, substantially twice that used in the first step, is mixed with from one to 5% its weight of an aliphatic acid preferably containing from 4 to 10 carbon atoms. A second reaction commences at once accompanied by the evolution of heat and the elimination of water. When no further heat is evolved the mixture is warmed to a temperature of from 80 to 95° C. and maintained at this point for a period of several hours. The resulting product, comprising a mixture of water with an oily liquid insoluble therein, is then separated and the yellow oily liquid comprises the accelerator desired.

The water of condensation produced in the first step of the reaction may be removed before adding the aldehyde and acid mixture or it may be allowed to remain throughout the entire process and removed at the end of the operation. Higher yields of n-butyl-amine may be realized by using an excess of ammonia in the reaction with the butyl halide. Iso-butyl chloride has been found to readily form higher proportions of the primary amine than does the normal-butyl chloride.

Reaction products of the type set forth have also been produced by carrying out the reaction as a one stage process, that is, by combining one molecular proportion of the aliphatic amine with substantially three molecular proportions of the aliphatic aldehyde in the presence of approximately 1% of a straight chain aliphatic acid. However, when the acid is present in a mixture of this type, a portion thereof combines with the amine present to produce a salt, which substances, and the Schiff's base produced therefrom, are non-accelerators of the rubber vulcanization process. Therefore, in order not to impair the accelerating power of the final product obtained, it is desirable to operate the process as a two stage operation and preferably to have the acid present only after the Schiff's base has been produced.

Other aliphatic amines and other aliphatic aldehydes have been combined with one another in the presence of acids to produce an aldehyde derivative of a Schiff's base of the type hereinbefore set forth. Thus, in place of butylamine employed in the example, other aliphatic amines such as the methylamines, ethylamines, propylamines, vinylamines, octylamines and other primary, secondary and tertiary and aliphatic amines may be reacted with an aldehyde to produce a Schiff's base, which base may then be combined with an aliphatic aldehyde such as propionaldehyde, butylaldehyde, heptaldehyde, valericaldehyde and the like in the presence of small proportions of an organic acid such as propionic acid, butyric acid, valerianic acid, heptylic acid and the like to produce compounds of the type set forth. Although inorganic acids have been successfully employed in place of the butyric acid used in the second stage of the process, I have found that it is preferable to employ the weaker organic acids set forth.

The various products manufactured by the process hereinbefore described have been found to comprise a class of efficient and powerful accelerators of the rubber vulcanization process which may be classified as semi-ultra accelerators. That is, the accelerators obtained in the present process produce fully vulcanized rubber products of high quality at lower temperatures and in a shorter vulcanization period than do most of the accelerators commonly employed. These preferred accelerators are not, however, so rapid in action as to preclude their use in most commercial processes as is the case with the so-called ultra accelerators, which substances are so very active as to cause an undesirable degree of prevulcanization during the milling and other operating steps. The accelerators comprising the subject matter of my invention are then intermediate in their accelerating action between those substances commonly employed for that purpose and the so-called ultra accelerators.

One example illustrative of the use of my preferred accelerators is the following composition comprising a pure gum stock. Such a mix has been obtained by preparing in the well known manner a compound comprising:

| | Parts |
|---|---|
| Smoked sheet rubber | 100 |
| Zinc oxide | 5 |
| Sulphur | 3.5 |
| Accelerator | 0.5 | as an accelerator, the reaction product obtained in the presence of 1% of butyric acid of two molecular parts of butyl-aldehyde on the Schiff base obtained by combining one molecular proportion of butylamine with an equivalent quantity of butylaldehyde was employed. The rubber mix was then vulcanized by heating in a press for about thirty minutes at a temperature of approximately 258° F., that is a steam pressure of twenty pounds per square inch. The vulcanized product on testing was found to have a modulus of elasticity at 300% elongation of 251, at 500% elongation of 640, at 700% elongation of 2760, a tensile strength at break of 4095 pounds per square inch and an ultimate elongation of 805%.

A rubber stock typical of a product employed as a tread stock has been manufactured in the usual manner by employing the following composition:

| | Parts |
|---|---|
| Smoked sheet rubber | 36.5 |
| #2 amber crepe rubber | 20 |
| Carbon black | 25 |
| Zinc oxide | 11 |
| Sulphur | 2 |
| Stearic acid | 1 |
| A blended mineral and vegetable oil | 1 |
| Mineral rubber | 3.5 |
| Accelerator, preferably the butyl-aldehyde reaction product of butyl-amine-butyl-aldehyde | 0.5 |

The physical characteristics of the vulcanized product which were obtained by heating in a press at a temperature given by forty pounds of steam pressure per square inch (287° F.) are as follows:

| Time of cure | Modulus at elongation of— | | Tensile at break | Ultimate elongation |
|---|---|---|---|---|
| | 300% | 500% | | |
| 45 minutes | 1723 | 3650 | 4225 | 580% |
| 60 minutes | 1868 | 3875 | 4240 | 560% |

It is apparent from the above, that a product of high commercial quality is produced by heating the rubber compound for approximately 45 minutes under the conditions set forth.

A hard rubber stock has also been manufactured in which accelerators of my new and preferred type have been employed. Such a stock comprises:

| | Parts |
|---|---|
| Amber crepe rubber | 20 |
| Smoked sheet rubber | 20 |
| Lime | 5 |
| Zinc oxide | 17.5 |
| Sulphur | 27.5 |
| Mineral rubber | 10 |
| One of my preferred accelerators | 2 |

It was found that a hard rubber of excellent commercial qualities was produced after heating the rubber stock specified for approximately two hours at the temperature given by 40 pounds of steam pressure per square inch.

The examples hereinbefore given are to be understood as being illustrative only and not at all limitative of my process. Thus, the accelerators of the type herein disclosed and comprising the reaction product of two molecular proportions of an aliphatic aldehyde in the presence of small proportions of an aliphatic acid upon a Schiff's base obtained by the condensation of an aliphatic amine with an aliphatic aldehyde may be used as vulcanization accelerators in other types of rubber compounds as are apparent to those skilled in the art of rubber compounding. I do not limit my claims solely to the particular type of rubber compound employed nor to the definite amount of the accelerating compounds used in the rubber mix as such factors will, of necessity, vary somewhat depending upon the ingredients used in the production of the compounds or upon the various compounding ingredients which may be employed in the rubber mix. Nor do I limit my claims by any theories or statements advanced by way of explanation of the changes involved nor to the exact method described of producing the accelerators employed in the process claimed.

What is claimed is:

1. The process of manufacturing vulcanized rubber which comprises heating a mixture of rubber and sulphur in the presence of a small proportion of a compound obtained by treating substantially one molecular proportion of a Schiff's base produced by combining substantially equimolecular proportions of an aliphatic amine and an aliphatic aldehyde with an acid of the aliphatic series containing from four to ten carbon atoms while simultaneously reacting said Schiff's base with substantially two molecular proportions of an aliphatic aldehyde.

2. The process of manufacturing vulcanized rubber which comprises heating a mixture of rubber and sulphur in the presence of a small proportion of a compound obtained by treating substantially one molecular proportion of a Schiff's base produced by combining substantially equimolecular proportions of an aliphatic primary amine and an aliphatic aldehyde with from 1 to 3% by weight of an aliphatic acid containing at least four carbon atoms while simultaneously reacting said Schiff's base with substantially two molecular proportions of an aliphatic aldehyde.

3. The process of manufacturing vulcanized rubber which comprises heating a mixture of rubber and sulphur in the presence of a small proportion of a compound obtained by treating substantially one molecular proportion of a Schiff's base produced by combining substantially equimolecular proportions of a butylamine and butyl-aldehyde with approximately 1% by weight of butyric acid while simultaneously reacting said Schiff's base with substantially two molecular proportions of butyl-aldehyde.

4. The process of manufacturing vulcanized rubber which comprises heating a mixture of rubber and sulphur in the presence of a small proportion of a compound obtained by treating substantially one molecular proportion of a Schiff's base produced by combining substantially equi-molecular proportions of n-butylamine and n-butyl-aldehyde with approximately 1% by weight of butyric acid while simultaneously reacting said Schiff's base with substantially two molecular proportions of n-butyl-aldehyde.

5. The process of manufacturing vulcanized rubber which comprises heating a mixture of rubber and sulphur in the presence of a small proportion of a compound obtained by treating a Schiff's base produced by combining substantially 73 parts by weight of n-butylamine and 72 parts by weight of n-butyl-aldehyde with approximately 3 parts by weight of butyric acid while simultaneously reacting and heat-treating said Schiff's base with substantially 144 parts by weight of n-butyl-aldehyde.

6. A vulcanized rubber product obtained by heating rubber and sulphur in the presence of a vulcanization accelerator, said accelerator comprising a compound obtained by treating substantially one molecular proportion of a Schiff's base produced by combining substantially equi-molecular proportions of an aliphatic amine and an aliphatic aldehyde with an acid of the aliphatic series containing from four to ten carbon atoms while simultaneously reacting said Schiff's base with substantially two molecular proportions of an aliphatic aldehyde.

7. A vulcanized rubber product obtained by heating rubber and sulphur in the presence of a vulcanization accelerator, said accelerator comprising a compound obtained by treating substantially one molecular proportion of a Schiff's base produced by combining substantially equi-molecular proportions of an aliphatic primary amine and an aliphatic aldehyde with from 1 to 3% by weight of an aliphatic acid containing at least four carbon atoms while simultaneously reacting said Schiff's base with substantially two molecular proportions of an aliphatic aldehyde.

8. A vulcanized rubber product obtained by heating rubber and sulphur in the presence of a vulcanization accelerator, said accelerator comprising a compound obtained by treating substantially one molecular proportion of a Schiff's base produced by combining substantially equi-molecular proportions of a butylamine and butyl-aldehyde with approximately 1% by weight of butyric acid while simultaneously reacting said Schiff's base with substantially two molecular proportions of butyl-aldehyde.

9. A vulcanized rubber product obtained by heating rubber and sulphur in the presence of a vulcanization accelerator, said accelerator comprising a compound obtained by treating substantially one molecular proportion of a Schiff's base produced by combining substantially equi-molecular proportions of n-butylamine and n-butyl-aldehyde with approximately 1% by weight of butyric acid while simultaneously reacting said Schiff's base with substantially two molecular proportions of n-butyl-aldehyde.

10. A vulcanized rubber product obtained by heating rubber and sulphur in the presence of a vulcanization accelerator, said accelerator comprising a compound obtained by treating a Schiff's base produced by combining substantially 73 parts by weight of n-butylamine and 72 parts by weight of n-butyl-aldehyde with approximately 3 parts by weight of butyric acid while simultaneously reacting and heat-treating said Schiff's base with substantially 144 parts by weight of n-butyl-aldehyde.

WINFIELD SCOTT.